United States Patent
Maeda et al.

(10) Patent No.: US 6,738,577 B1
(45) Date of Patent: May 18, 2004

(54) DISPLAY DEVICE AND AN OPTICAL DEVICE PROVIDED WITH SAME

(75) Inventors: Yasuo Maeda, Kawachinagano (JP); Akihiko Fujino, Sakai (JP); Reiji Seki, Tondabayashi (JP); Noriyuki Ishii, Sakai (JP); Makoto Akesaka, Sakai (JP); Satoshi Yokota, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/457,374

(22) Filed: Dec. 9, 1999

(30) Foreign Application Priority Data

Dec. 10, 1998 (JP) ............................. 10-351269

(51) Int. Cl.7 ........................... G03B 17/18; G03B 13/02
(52) U.S. Cl. ....................................... 396/287; 396/373
(58) Field of Search ................................ 396/287, 296, 396/373, 374, 384, 290, 291, 292, 383; 345/76

(56) References Cited

U.S. PATENT DOCUMENTS

| | | | | |
|---|---|---|---|---|
| 3,657,778 A | * | 4/1972 | Boucher ...................... 445/24 |
| 3,673,572 A | * | 6/1972 | Silva et al. ................... 345/76 |
| 4,645,970 A | * | 2/1987 | Murphy ....................... 313/509 |
| 4,711,547 A | * | 12/1987 | Iizuka ......................... 396/287 |
| 5,603,068 A | * | 2/1997 | Aihara ........................ 396/287 |
| 5,652,930 A | * | 7/1997 | Teremy et al. ............... 396/287 |
| 5,757,127 A | * | 5/1998 | Inoguchi et al. ............. 313/507 |
| 5,902,688 A | * | 5/1999 | Antoniadis et al. ......... 428/690 |
| 6,468,676 B1 | * | 10/2002 | Ueda et al. ................. 428/690 |

FOREIGN PATENT DOCUMENTS

JP          10-186492          7/1998

* cited by examiner

*Primary Examiner*—Rodney Fuller
*Assistant Examiner*—Arthur A Smith
(74) *Attorney, Agent, or Firm*—Morrison & Foerster LLP

(57) ABSTRACT

A display device 70 having an organic luminescent element arranged at an object image-forming position of a finder optical system. Frames are formed by parts 31b, 32b, 33b of the negative electrode formed of non-transparent material, an organic electroluminescent material is laminated thereon on the eyepiece side, and a positive electrode formed of transparent material is superimposed thereon on the eyepiece side. Since the non-transparent negative electrodes 31b, 32b, 33b shield the light, the frames are recognized as black frames. When the periphery is dark, a voltage is applied between the electrodes causing the organic electroluminescent material to luminesce, such that the frame itself becomes brighter in display and is readily visible.

14 Claims, 14 Drawing Sheets

DISPLAY DEVICE AND AN OPTICAL DEVICE PROVIDED WITH SAME

This application is based on Patent Application No. HEI 10-351269 filed in Japan, the content of which is hereby incorporated by reference.

BACKGROUND OF THE INVENTION

1. Field of the Invention

The present invention relates to a display device and an optical device provided with same.

2. Description of the Related Art

Conventionally, in singles lens reflex cameras for example, viewable within a finder are a wide focus frame 7 arranged on the interior side of a field-of-view frame 4, a spot focus frame 8, a spot photometry frame 9, and in-finder display areas 6a or 6b arranged on the exterior side of the field-of-view frame 4, as shown in FIGS. 12 and 13. The field-of-view frame 4 represents the photographic range of an image projected on the film. The wide focus frame 7 represents an autofocus (AF) area frame when a wide range photographic subject is focus detected, and the taking lens focal point is automatically adjusted. The spot focus frame 8 represents the AF area frame when a narrow range photographic subject is focus detected, and the taking lens focal point is automatically adjusted. The spot photometry frame 9 represents the photometry region for photometry of a narrow range photographic subject. The in-finder display areas 6a and 6b display photographic information such as shutter speed, aperture value, focusing condition, and photographic mode.

Among these displays, the wide focus frame 7 arranged on the interior side of a field-of-view frame 4, the spot focus frame 8, and the spot photometry frame 9 are formed by layout lines, by marking-off, drawn on the focusing glass disposed at the subject image forming position, and these frames are illuminated from outside via an LED or the like since they are not themselves luminous. For this reason a special illuminator is required, and the illumination position must be adjusted when assembling the finder.

For example, as shown in FIG. 14, a single lens reflex camera has been proposed which forms a display of the frames and the like on the interior side of the field-of-view frame 4 via a transmission-type liquid crystal panel 101 arranged adjacent to the focusing plate 67, so as to view the display of the liquid crystal panel 101 using the light passing through a taking lens 65 and reflected by a quick return mirror 66. The display of the frames and the like by the liquid crystal display 101 are difficult to see when the subject luminance is low since the display itself is not luminous.

In this single lens reflex camera, the display of the field-of-view frame 4 is constructed such that the liquid crystal panel 112 for displaying text and images is illuminated by a backlight 111, and this light is guided from a prism 113 to a pentagonal roof prism 68 so as to be viewable through an eyepiece lens 69. The light from an LED 121 is guided from a mask 122, lens 124, and prism 126 to the pentagonal roof prism 68, so as to be viewable through the eyepiece 69. For this reason space is required for the arrangement of the liquid crystal panel 112 and the LED 122 and the like.

SUMMARY OF THE INVENTION

An object of the present invention is to provide a display device of simple construction which allows a display within the device to be easily viewed, and an optical device provided with the same.

One aspect of the present invention to achieve these objects provides a display device having the construction described below, and an optical device provided with the same.

The display device and the optical device are provided with a display area achieving a display via luminance from a luminescent element. The luminescent element is provided with electrodes, and a thin film of, for example, organic electroluminescent material interposed between the electrodes, such that the thin film luminesces when a voltage is applied between the electrodes.

The electrodes of the luminescent element include a transparent electrode formed of a transparent material, and a non-transparent (opaque) electrode formed of non-transparent material, and a light-shield display mark within the finder is formed by the non-transparent electrode. Here, in the present application, the display mark includes characters, symbols, pictographs illustrations and so on.

According to this construction, a luminescent display mark is formed by the organic luminescent element, and the light-shield display mark is formed by the same organic luminescent element by rendering part of the electrode non-transparent.

The layout of a conventional device becomes unnecessary by constructing the organic luminescent element on a single substrate, and forming the non-transparent electrode by patterning same as display marks such as the frames, characters and the like desired for display. The luminescent display mark can be made easily visible by a bright display even when the periphery is dark.

Accordingly, the display mark within the device can be easily seen via a simple construction.

The organic electroluminescent material is disposed on the eyepiece side adjacent to the non-transparent electrode forming the light-shield display mark, the transparent electrode is arranged on the eyepiece side adjacent to the organic electroluminescent material, and as a result the luminescent display mark is overlaid on the light-shield display mark on the eyepiece side.

According to this construction, when the object is dark and the light-shield display mark displayed within the device is difficult to see, visibility can be improved by emitting light from the luminescent display mark overlaying the light-shield display mark.

An object brightness detector for detecting the brightness of an object to be viewed, and a luminescent display mark controller for generating luminescence of the luminescent display mark in accordance with the brightness of the object detected by the object brightness detector are both provided.

According to this construction, visibility and operating characteristics are improved by detecting the dark periphery and automatically luminescing the luminescent display mark.

The display device is provided with two or more luminescent display marks capable of luminescing independently, and a luminescent display selector for selecting the luminescent display mark. A luminescent display mark selected by the luminescent display selector is caused to luminesce.

According to this construction, a selected region or mode can be easily recognized via the lighted luminescent display mark by the selective luminescence of an optional luminescent display, i.e., lighting of the display mark, from among a plurality of luminescent display marks for displaying focus detection area, photometry area, photographic mode and the like.

Another aspect of the present invention is to provide a display device and an optical device of the following construction.

The display device and the optical device are provided with a display area achieving a display via luminance from a luminescent element. The luminescent element is provided with electrodes, and a thin film of, such as, organic electroluminescent material interposed between the electrodes, such that the thin film luminesces when a voltage is applied between the electrodes.

The luminescent element is arranged in a position through which passes light from the object to be viewed. The luminescent display mark is formed at the area through which passes the light from the object. The electrodes of the organic luminescent element are formed by a transparent material at the area through which pass the light from the object.

In this construction, a luminescent display mark can be disposed in an optical path within the device using a transparent electrode to light the luminescent element, thereby minimizing the space required, rendering the device more compact and simplifying construction compared to conventional methods which render a display from outside the optical system. Furthermore, the luminescent display area provides a readily visible and bright display even when the object is dark.

Accordingly, the display within the device is easily viewed via a simple construction.

An example of the construction of the optical device follows below.

Firstly, the optical device is described as a camera having a finder provided with an optical system for forming an object image through a taking lens. The luminescent element is disposed near the image forming position of the object image viewed through the finder.

According to this construction, when a taking lens, reflective mirror, focusing plate, pentagonal roof prism or reflective optical system, and an eyepiece lens are provided as in the case of, for example, a conventional single lens reflex camera, the luminescent element is disposed medially to the pentagonal roof prism or reflective optical system and the focusing plate for forming an object image passing through the taking lens, such that the display via the luminescent element is visible together with the formed object image.

Secondly, the optical device is described as a camera having a finder provided with an objective prism and an eyepiece prism arranged medially to an objective lens and an eyepiece lens for forming an object image between the objective prism and the eyepiece prism. The luminescent element is disposed medially to the objective prism and the eyepiece prism.

According to this construction, a display via the luminescent element together with the formed object image are both visible from the finder by disposing the luminescent element medially to the eyepiece prism and the objective prism for forming the object image.

Still another aspect of the present invention is to provide a display device and an optical device of the following construction.

The display device and the optical device are provided with a display area achieving a display via luminance from an luminescent element. The luminescent element is provided with electrodes, and a thin film of, e.g., organic electroluminescent material interposed between the electrodes, such that the thin film luminesces when a voltage is applied between the electrodes.

A plurality of display areas are integratedly formed on the same substrate, and respectively arranged on the interior side and the exterior side of the field-of-view frame within the device.

According to this construction, the device is made more compact and inexpensive by integratedly forming the luminescent display areas on the interior side and the exterior side of the field-of-view frame. Furthermore, the luminescent display marks provide readily visible and bright display even when the object is dark.

Accordingly, the display within the device is easily viewed via a simple construction.

The luminescent element is arranged in a position through which passes light from the object to be viewed. Among the electrodes of the luminescent element, the part disposed on the-interior side of the field-of-view frame within the finder is formed by a transparent material, and the part disposed on the exterior side of the field-of-view frame is formed of a non-transparent material.

According to this construction, the overall wiring resistance can be reduced and the luminance efficiency improved by using a transparent material for the part of the electrode which must be transparent so as to not hinder the field of view due to its disposition within the field-of-view frame, and using a non-transparent material which has a lower electrical resistance than the transparent material for the part of the electrode that need not be transparent on the exterior side of the field-of-view frame.

The organic luminescent element is rectangular in shape having a long edge and a short edge, wherein the extending part of the electrode is disposed on the long edge side.

According to this construction, the total wiring length of the electrodes can be reduced so as to reduce the electrical resistance and improve luminescence efficiency by arranging the extending part of the electrode, which supplies power to the electrode from an external source, on the exterior long edge of the organic luminescent element.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The various embodiments of the present invention are described hereinafter with reference to the accompanying drawings.

Figure 1:
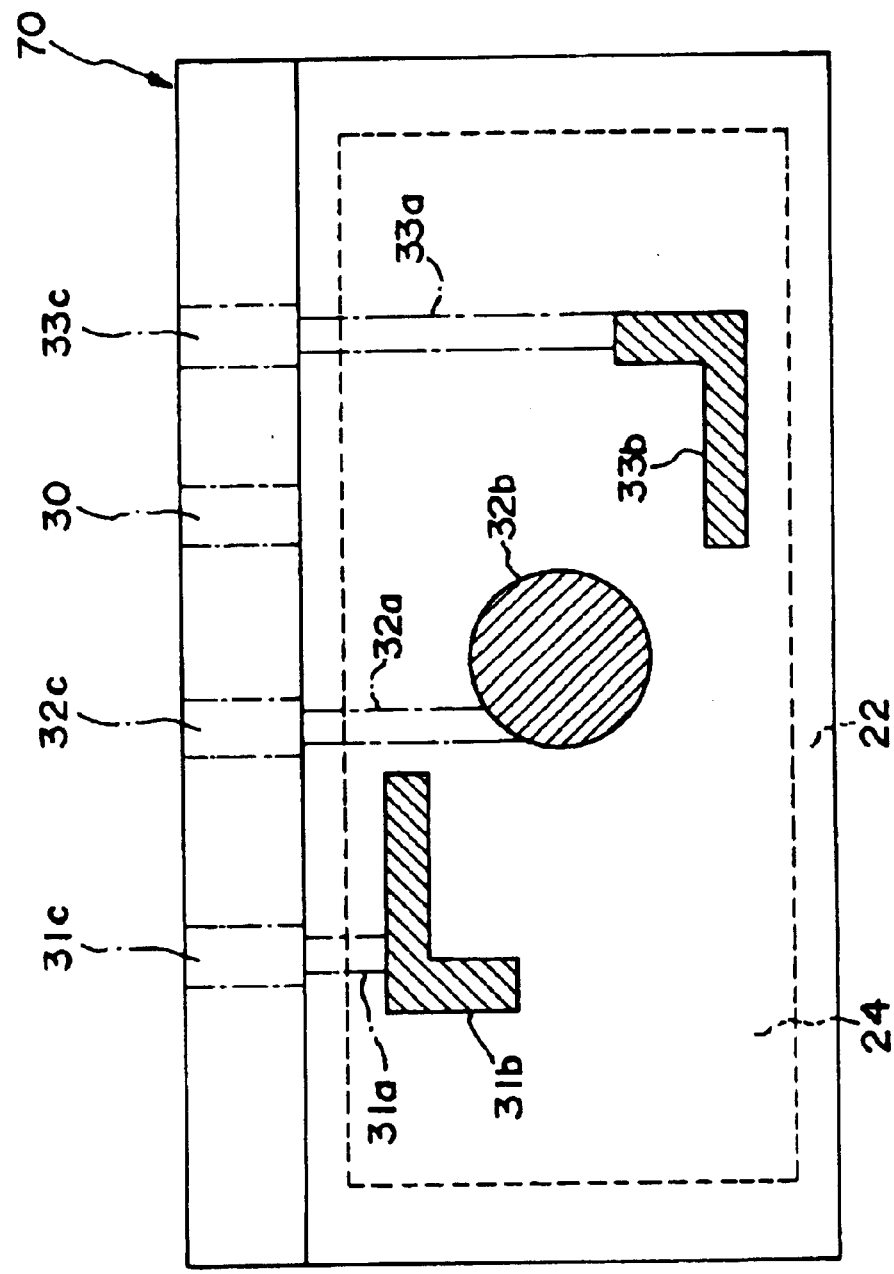
FIG. 1 is a plan view of a first embodiment of the present invention.
Figure 2:
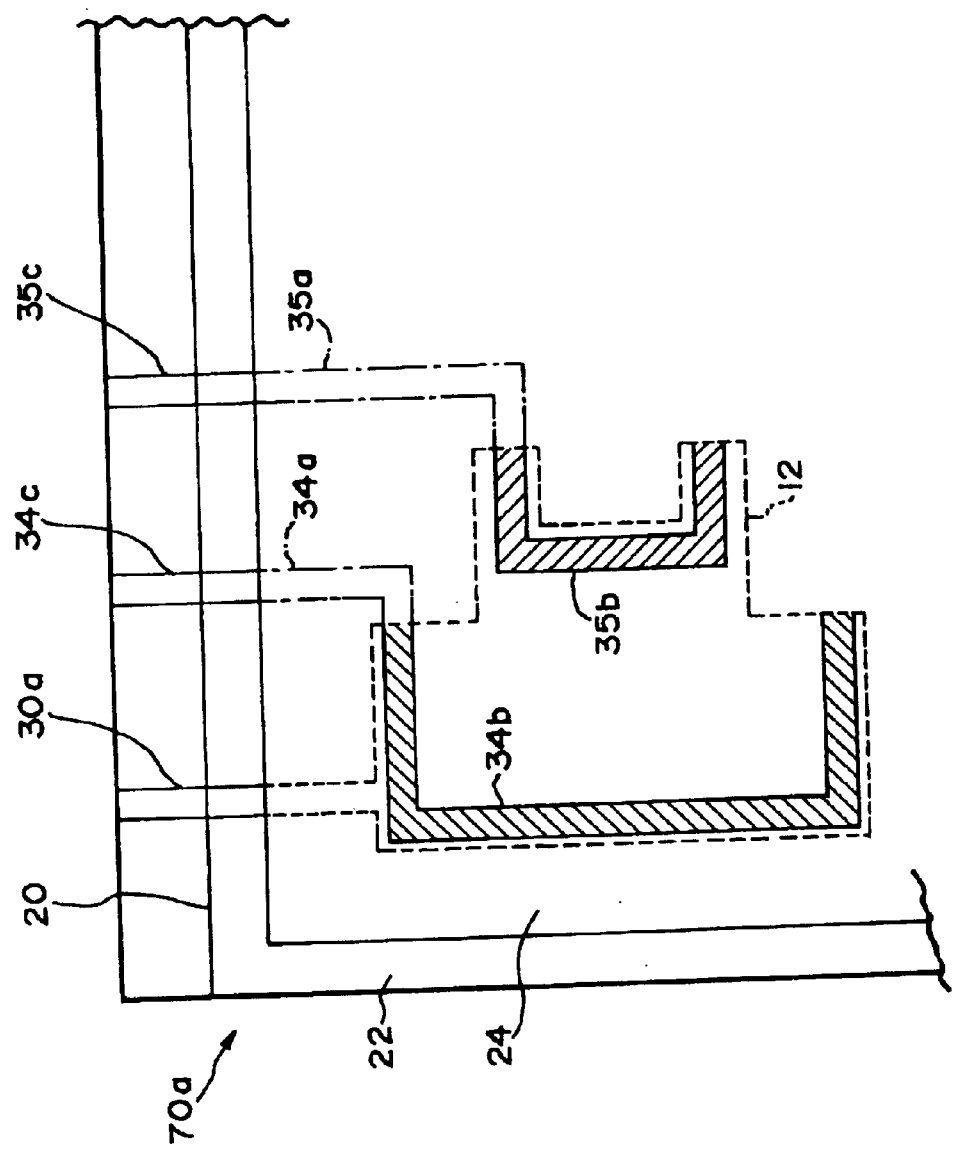
FIG. 2 is an enlargement of the essential part of the plan view showing a first modification of the first embodiment.
Figure 3:
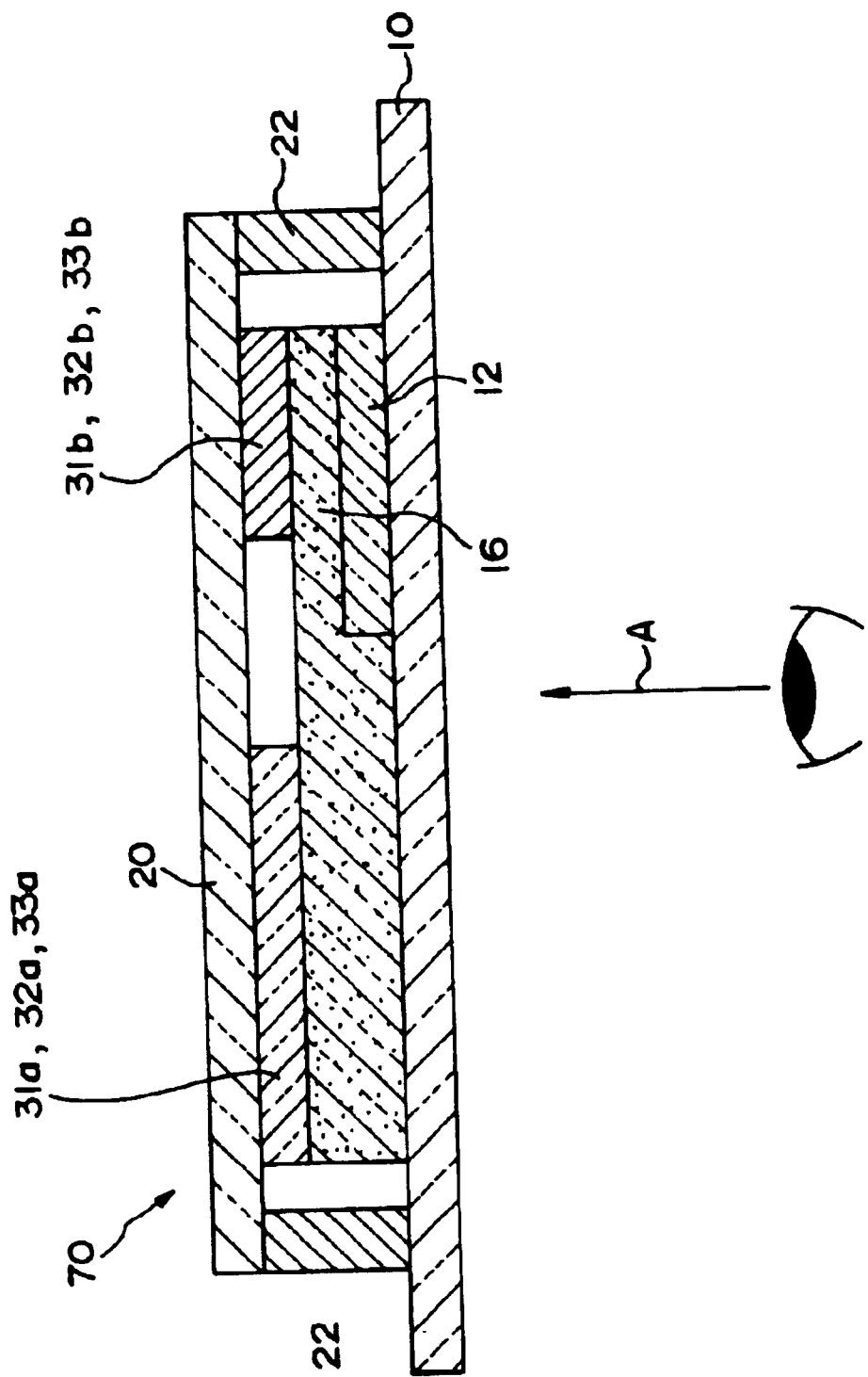
FIG. 3 is a cross-sectioned structural view of the first embodiment.
Figure 4:
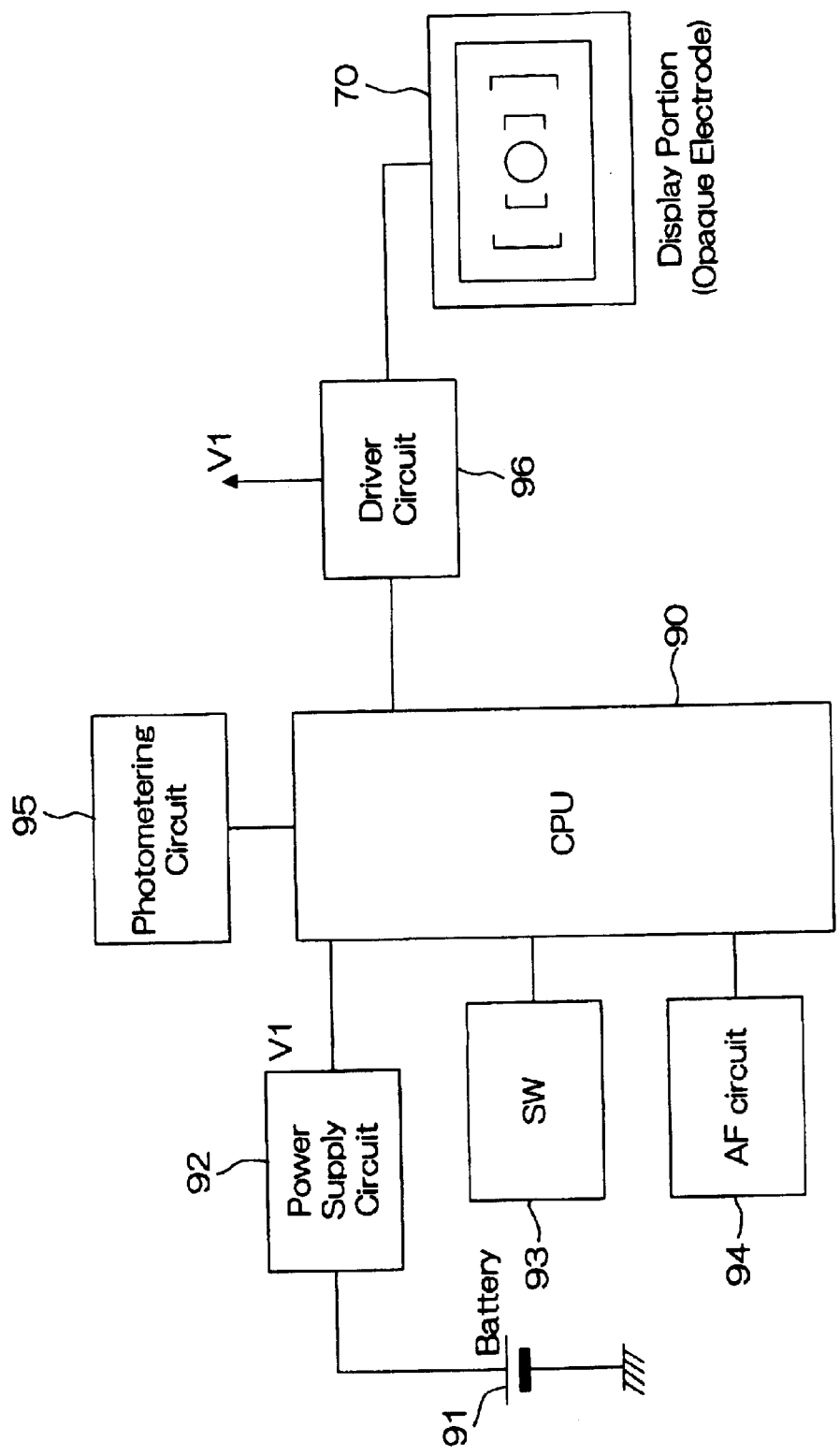
FIG. 4 is a block diagram of the electrical circuit of the first embodiment.
Figure 5:
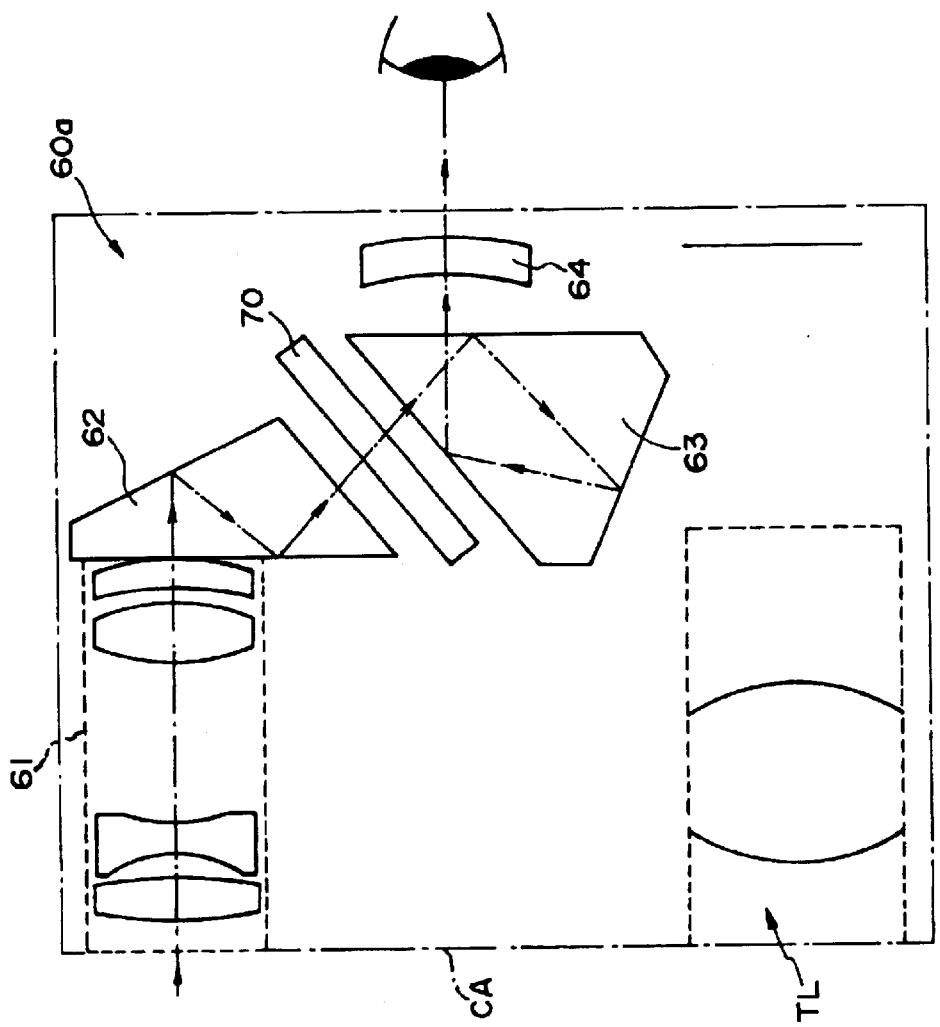
FIG. 5 shows the construction of the finder optical system of the first embodiment.
Figure 6:
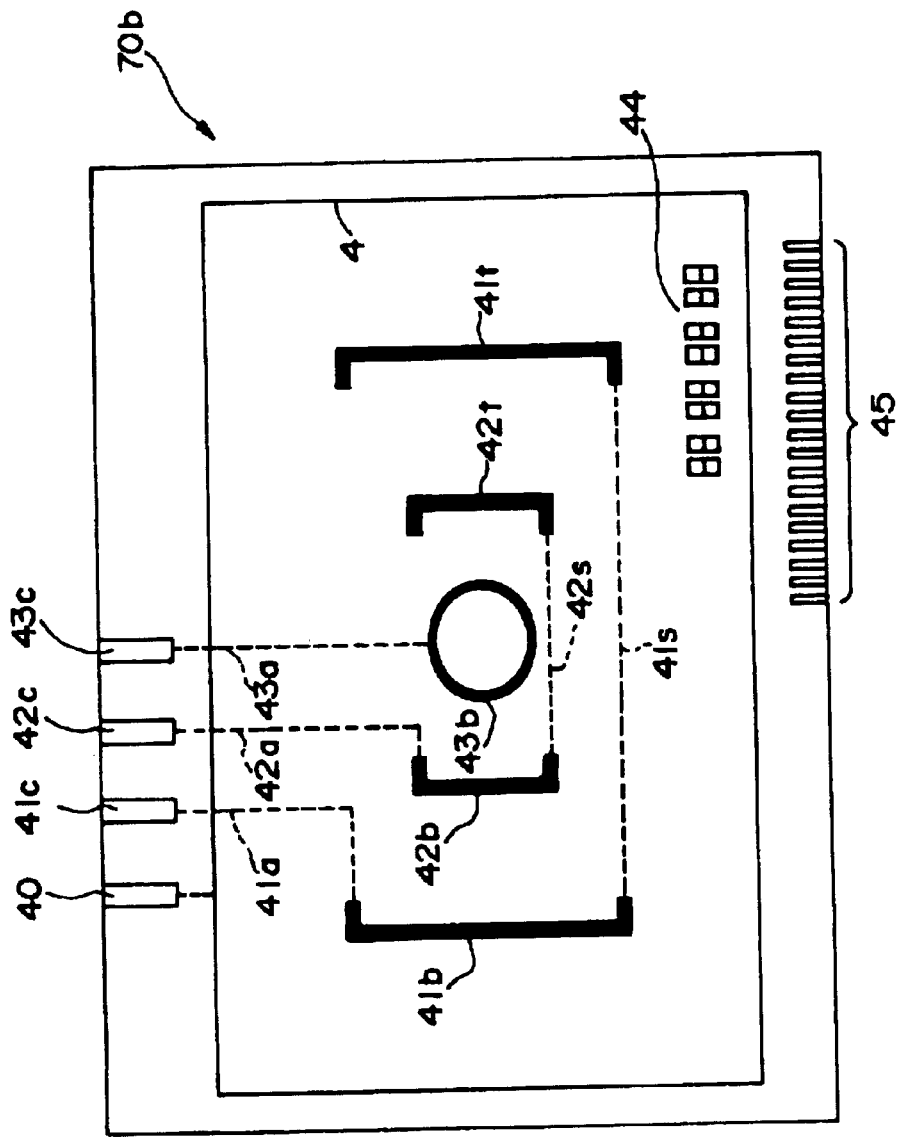
FIG. 6 is a plan view of a second modification of the first embodiment.

First, a first embodiment of a camera for forming a display area only on the interior side of a field-of-view frame within a finder is described hereinafter with reference to FIGS. 1 through 6. This camera is provided with a finder optical system independent of the photographic optical system, and this camera may be a camera using a film, digital camera, or movie camera. FIG. 1 is a plan view showing the display device. FIG. 2 is an enlarged plan view of the essential part of a modified display device. FIG. 3 is a cross-sectioned structural view of the display device of FIG. 1. FIG. 4 is a block diagram of the electrical circuits for lighting the display device. FIG. 5 shows the construction of the finder optical system. FIG. 6 is a plan view of another modified display device having a 7-segment display area within the field-of-view frame.

The camera CA of the present embodiment is provided with a finder optical system 60a separate from the photographic optical system TL, as shown in FIG. 5. The finder optical system 60a is provided with an objective lens 61, an objective prism 62, an eyepiece prism 63, and an eyepiece lens 64, and a display device 70 having an organic luminescent element is disposed at the object image forming position between the objective prism 62 and the eyepiece prism 63.

The display device 70 having an organic luminescent element as shown in FIG. 1 is visible within the finder. The display device 70 has an organic electroluminescent material 16 formed within the effective field of view area 24, i.e., over the near entirety of the interior side of a sealant 22, and display marks, i.e. a pair of frames 31b and 33b and a spot frame 32b formed by the non-transparent (opaque) parts (e.g., metallic material) of the negative electrode, such that each frame 31b, 32b, 33b is electrically connected to connectors 31c, 32c, 33c via the respective transparent parts (e.g., ITO layer) 31a, 32a, 33a of the negative electrode. The transparent positive electrode is disposed at a position opposite the non-transparent negative electrode circumscribing the organic electroluminescent material 16.

Only the area of the organic electroluminescent material 16 in the region circumscribed by the transparent positive electrode and the non-transparent parts 31b, 32b, 33b of the negative electrode luminesces when current flows via the application of a voltage to both electrodes. The positive electrode is connected to a connector 30. The interior of the effective field of view area 24 is transparent except for the frames 31b, 32b, 33b, such that the formed subject image is viewable.

The display device 70 has a laminate construction of a transparent substrate 10 upon which are superimposed thin layers of a positive electrode 12, an organic electroluminescent material 16, and negative electrodes 31a and 31b, 32a and 32b, 33a and 33b, and the thin layers are sealed and protected by a sealing member 20 which covers these thin layers and a sealant 22 which circumscribes the periphery of these thin layers, as shown in FIG. 3. Specifically, an object image is viewable via the transmitted light in the region including the organic electroluminescent material 16 in contact with the transparent parts 31a, 32a, 33a of the negative, electrode. An object image cannot be viewed through the electrodes 31b, 32b, 33b in the region of the non-transparent parts 31b, 32b, 33b of the negative electrodes. The display device 70 is arranged with the substrate 10 on the eyepiece side and the sealing member 20 on the objective side, as indicated by the arrow A. When a voltage is applied between the positive electrode and the non-transparent parts 31b, 32b, 33b of the negative electrode, holes and electrons in the interior of the material 16 migrate and bond such that the thin layer of organic electroluminescent material 16 luminesces in red, blue, yellow, or green color in accordance with the characteristics of the organic electroluminescent material 16.

The voltage is supplied to the display device 70 through a drive circuit 96, as shown in FIG. 4. Since the brightness of the luminance of the organic electroluminescent material 16 is proportional to the electrical current density and is not proportional to the drive voltage, the drive circuit 96 also may be in a constant-current circuit. The brightness of luminescence can be easily changed in accordance with the brightness of the object if the electrical current value is variable by control from a CPU 90. The voltage control is accomplished by the CPU 90 which controls the operation of the camera. The CPU 90 is connected to a power supply circuit 92 for supplying a fixed voltage from a battery 91, a switching circuit 93 for selecting focus detection area and photographic mode, and operating the lenses and the like, an AF circuit 94 for automatic adjustment of the focal point of the taking lens, and a photometry circuit 95 for detecting the brightness of a photographic object.

Since the pair of frames 31b and 33b and the spot frame 32b in the center are formed by the non-transparent part of the negative electrode through which light is not transmitted, they appear dark when the object is bright so as to be recognizable as display marks. On the other hand, identification of the display marks are difficult unaided when the peripheral or object brightness is low, but can be recognized by luminescing the organic electroluminescent material 16 on the eyepiece side via application of a voltage between the electrodes 12 and 31b, 32b, 33b.

Since the display mark itself luminesces, the illuminator for illuminating the display mark from outside the display as in the conventional art is unnecessary, and the construction is simplified. Furthermore, the position adjustment operation for the illuminator also is unnecessary. In addition, if the periphery of the sealing member 20 and the sealant 22 are non-transparent, for example, the field-of-view frame and the display mark may be integratedly formed so as to avoid generating positional dislocation of the display mark relative to the field-of-view frame.

FIG. 2 shows the display device 70 electrode pattern having a different configuration than the display mark of FIG. 1. The negative electrodes 34a and 34b, and 35a and 35b comprise parts 34b and 35b formed of non-transparent material and forming the frame, that is, the display marks, and other parts 34a and 35a formed of transparent material.

The entirety of the positive electrode 12 is formed of transparent material. The organic electroluminescent material is disposed between the electrodes. The positive electrode 12 and the negative electrodes 34a and 35a are electrically connected to connectors 30a, 34c, and 35c provided at the end of the long edge side of the display device 70, so that a voltage can be applied thereto.

FIG. 6 is a display device 70b comprising a 7-segment display area 44 within the field-of-view frame.

Formed on the interior side of the field-of-view frame 4 via the non-transparent part of the negative electrodes are wide focus detection area frames 41b and 41t, standard focus detection area frames 42b and 42t, and a spot photometry area frame 43b, i.e. display marks. Since the frames 41b and 41t, 42b and 42t, and 43b are formed by the non-transparent parts of the negative electrodes, a transparent material is used for the connecting lines 41a and 41s, 42a and 42s, and 43a to the connectors 41c, 42c, 43c provided on the top end of the long edge of the display device 70b. The positive electrode is formed in a pattern corresponding to the non-transparent part of the negative electrodes, and is connected to the connector 40.

On the other hand, the 7-segment display area 44 arranged at the lower left on the interior side of the field-of-view frame 4 and the electrodes and organic electroluminescent material are formed entirely of transparent material, and the display area 44 is electrically connected to a connector 45 provided on the bottom edge of the display panel 70b. The transparency of the 7-segment display area 44 displays numerical values by lighting various of the 7-segment display elements, and normally each display element need not be visible.

Figure 7:
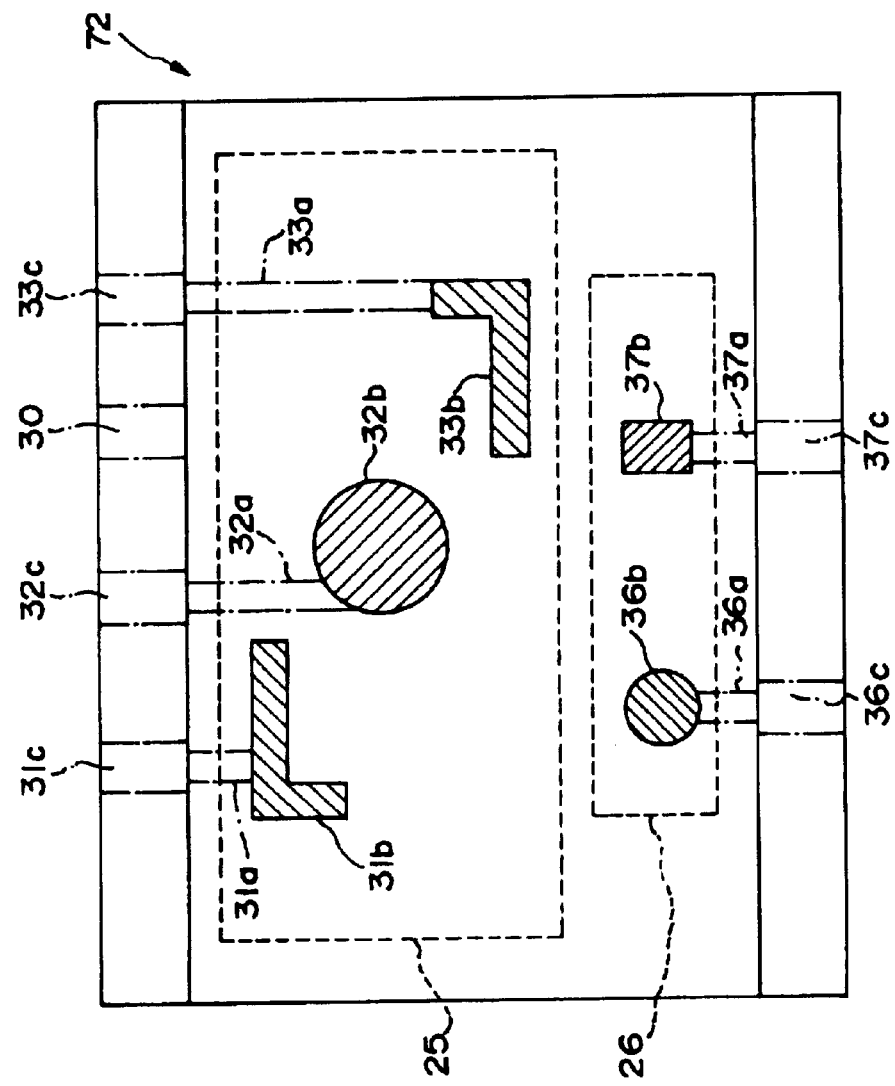
FIG. 7 is a schematic plan view of a second embodiment of the present invention.
Figure 8:
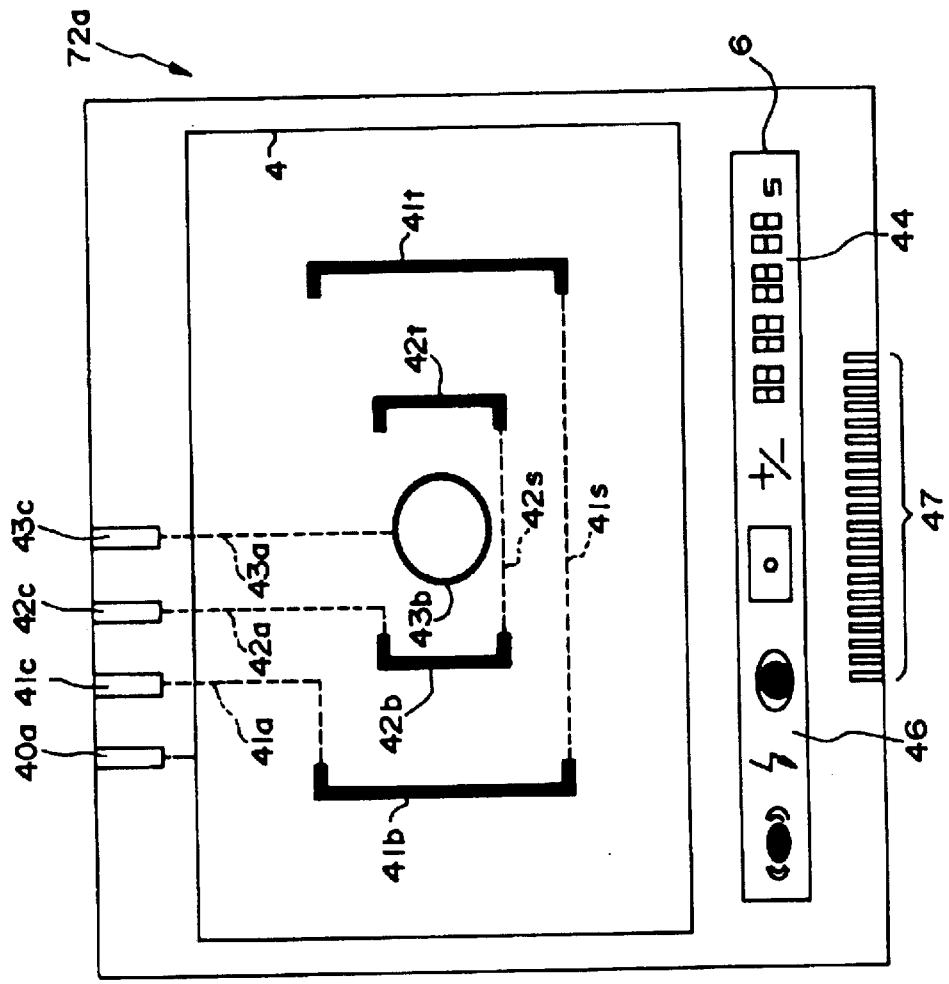
FIG. 8 is a plan view of the second embodiment.

A second embodiment provided with a display area on both the interior side and the exterior side of a field-of-view frame is described below. Parts having the same construction as in the first embodiment are designated by the same reference numbers, and the aspects which differ from the core of the described below. FIG. 7 is a schematic plan view of a display device. FIG. 8 is a plan view of the display device having an icon display area and a 7-segment display area on the exterior side of the field-of-view frame.

As shown in FIG. 7, the display device 72 has an effective field of view area 25 including the field-of-view frame, and an effective field of view area 26 outside the field-of-view frame. The effective field of view area 25 including the field-of-view frame contains display marks 31b, 32b, 33b formed by electrodes comprising transparent and non-transparent material similar to the first embodiment. The effective field of view area 26 outside the field-of-view frame displays the marks 36b and 37b via the luminescent areas. Since the effective field of view 26 outside the field-of-view frame does not require light transmission as does the effective area 25 which includes the field-of-view frame, a non-transparent material may be used to form the entirety of the negative electrodes 36a and 36b, 37a and 37b, and the seal material 20 positioned on the objective side of the finder. The positive electrode is transparent so as to have the luminescent area-visible, is integratedly formed with the positive electrode within the field-of-view frame 25, and is connected to a connector 30.

Specifically, the display device 72 has a construction identical to that of FIG. 6 on the interior side of the field-of-view frame 4, but has an in-finder display area 6 on the exterior side of the field-of-view frame 4, as shown in FIG. 8. The in-finder display area 6 comprises a 7-segment display area 44 for displaying shutter speed, aperture value, film sensitivity, film frame number and the like, and an icon display area 46 for displaying icons such as AF mode, flash mode and the like, and the in-finder display area 6 is electrically connected to a connector 47.

Figure 9:
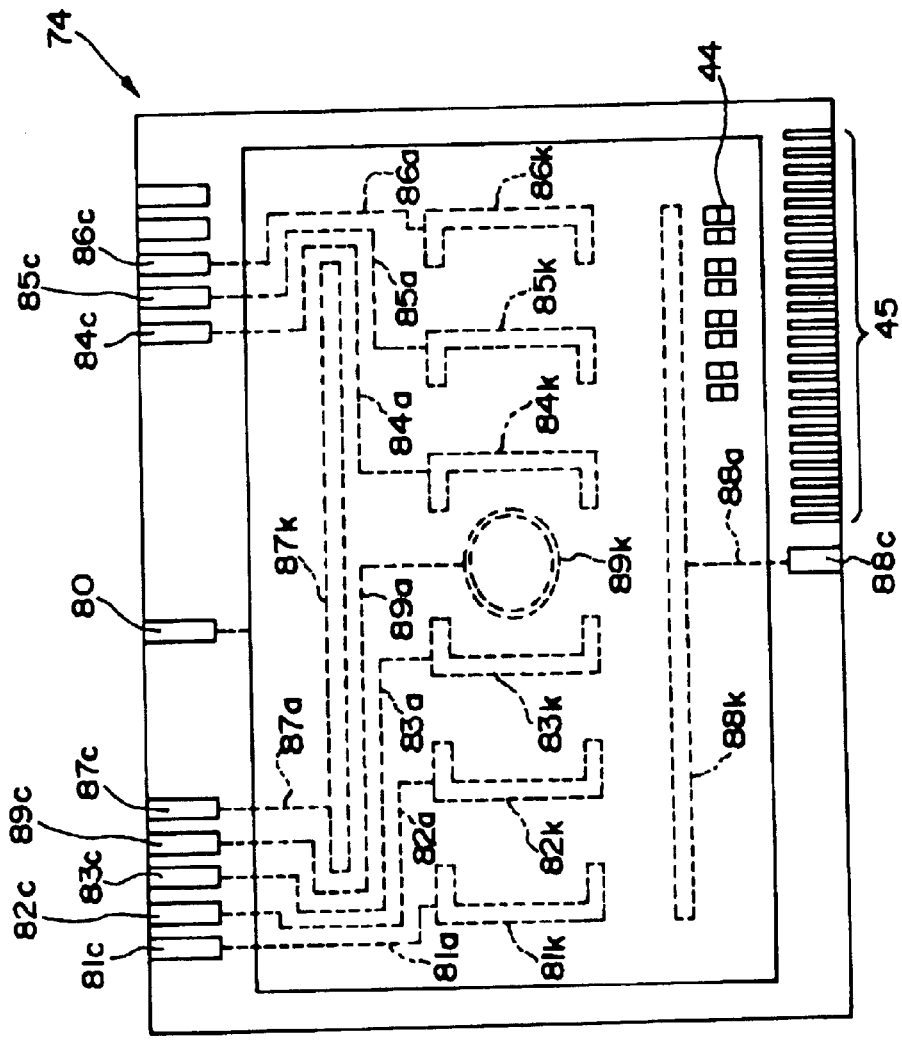
FIG. 9 is a plan view of a third embodiment of the present invention.
Figure 10:
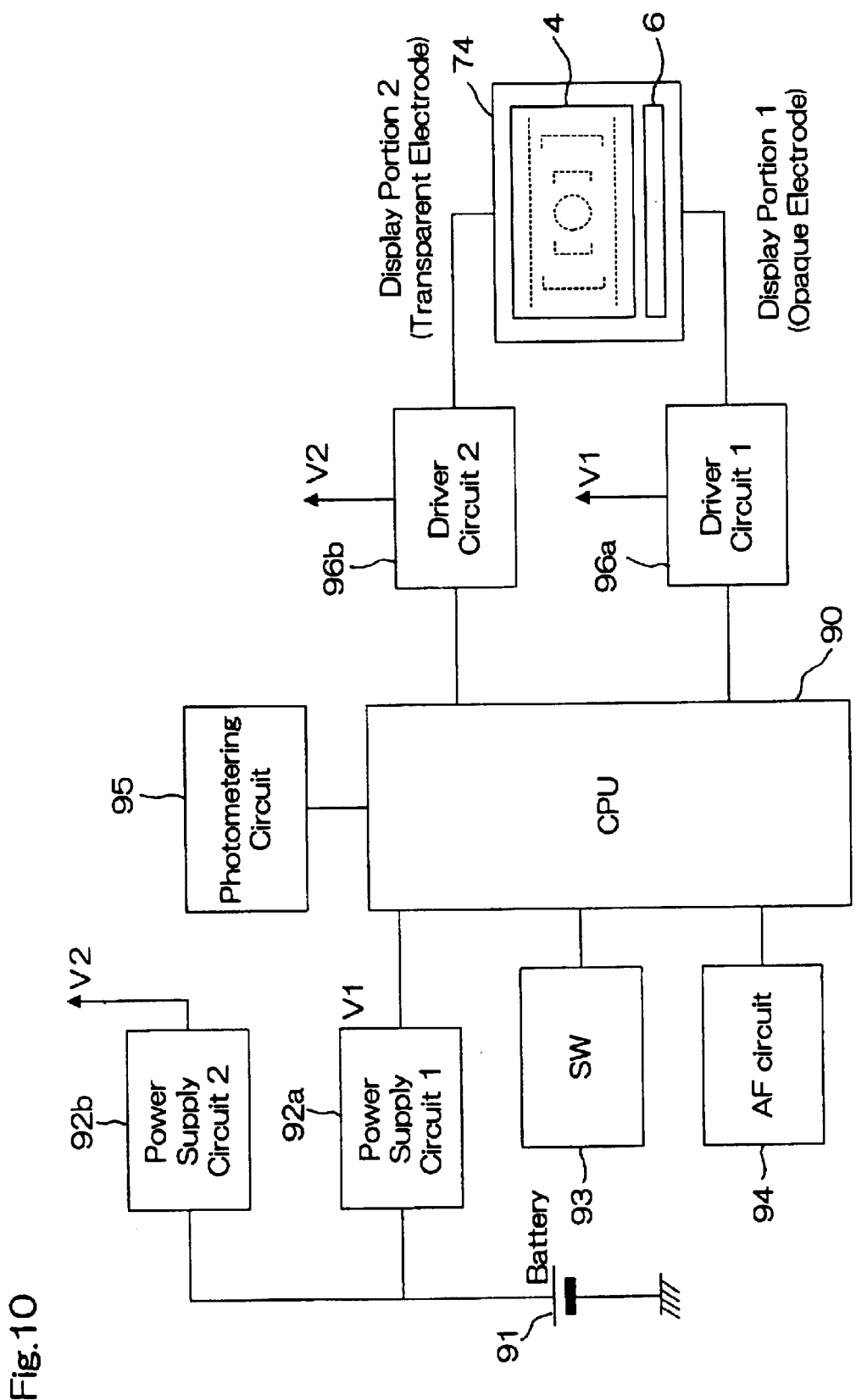
FIG. 10 is a block structural diagram of the electrical circuits of the third embodiment.

A third embodiment particularly suitable for a single lens reflex camera is described below. FIG. 9 is a plan view of a display device, FIG. 10 is a block diagram of the electrical circuits, and FIG. 11 shows the construction of the finder optical system.

Figure 11:
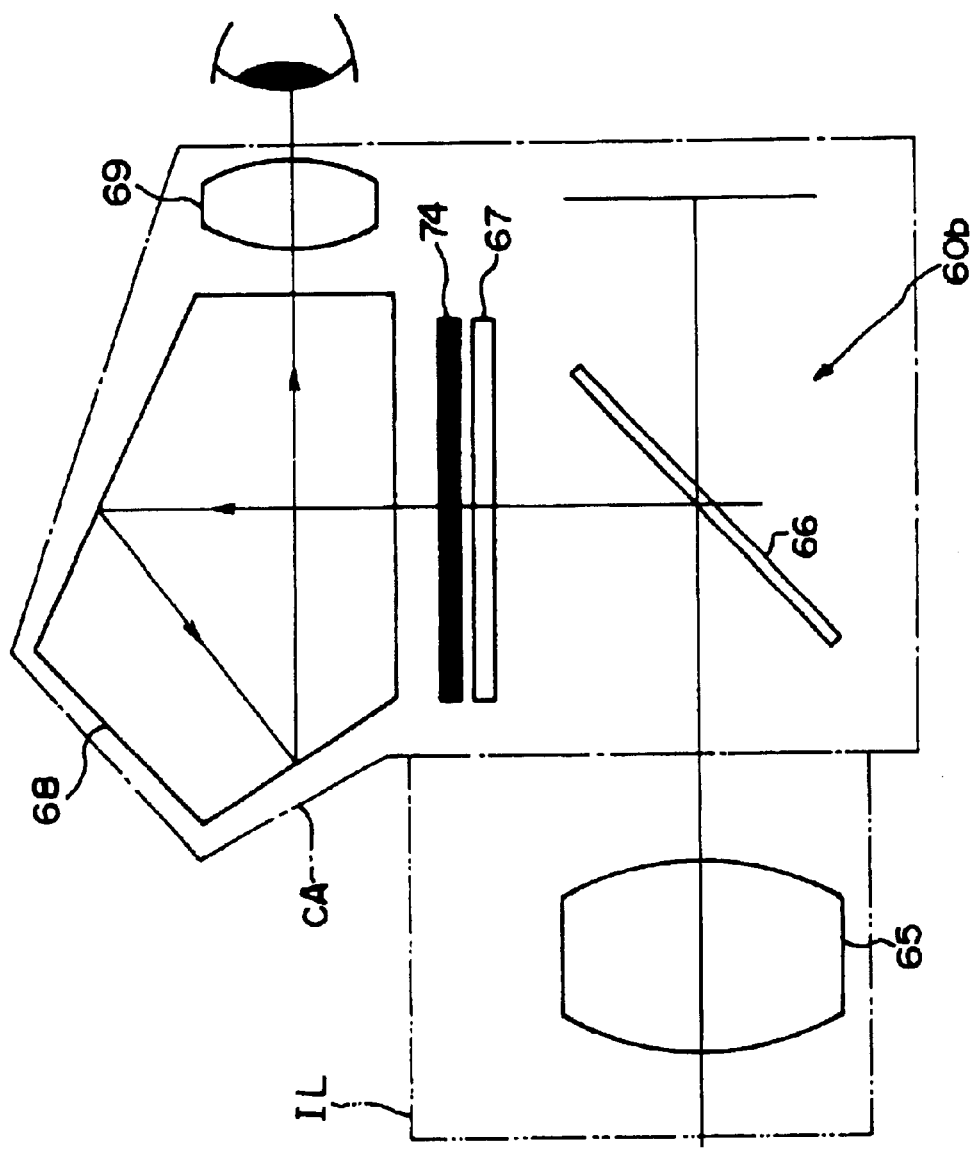
FIG. 11 shows the construction of the finder optical system of the third embodiment.
Figure 12:
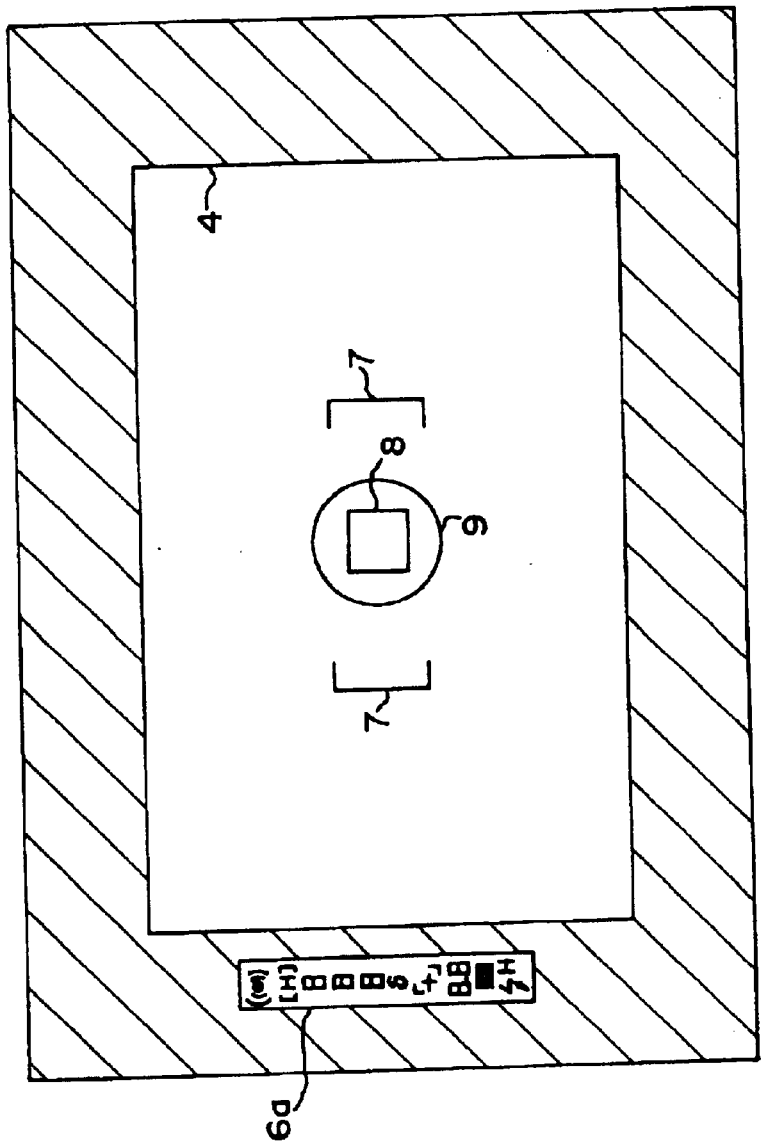
FIG. 12 is an elevation view of a conventional in-finder display.
Figure 13:
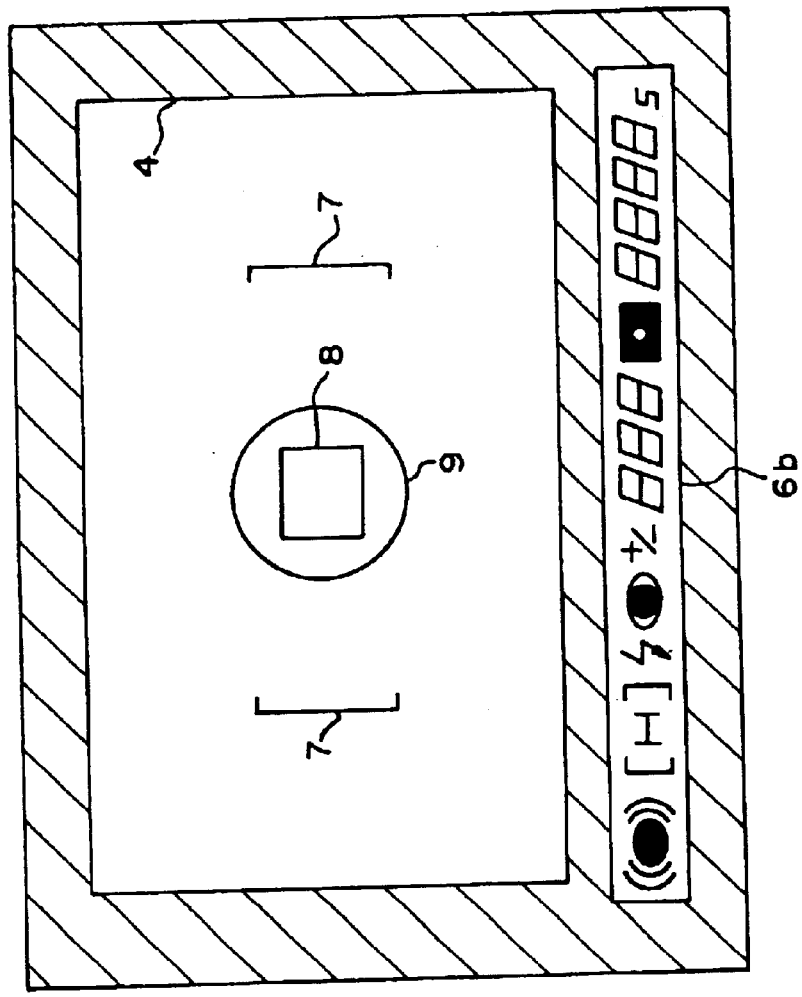
FIG. 13 is an elevation view of another example of a conventional in-finder display.
Figure 14:
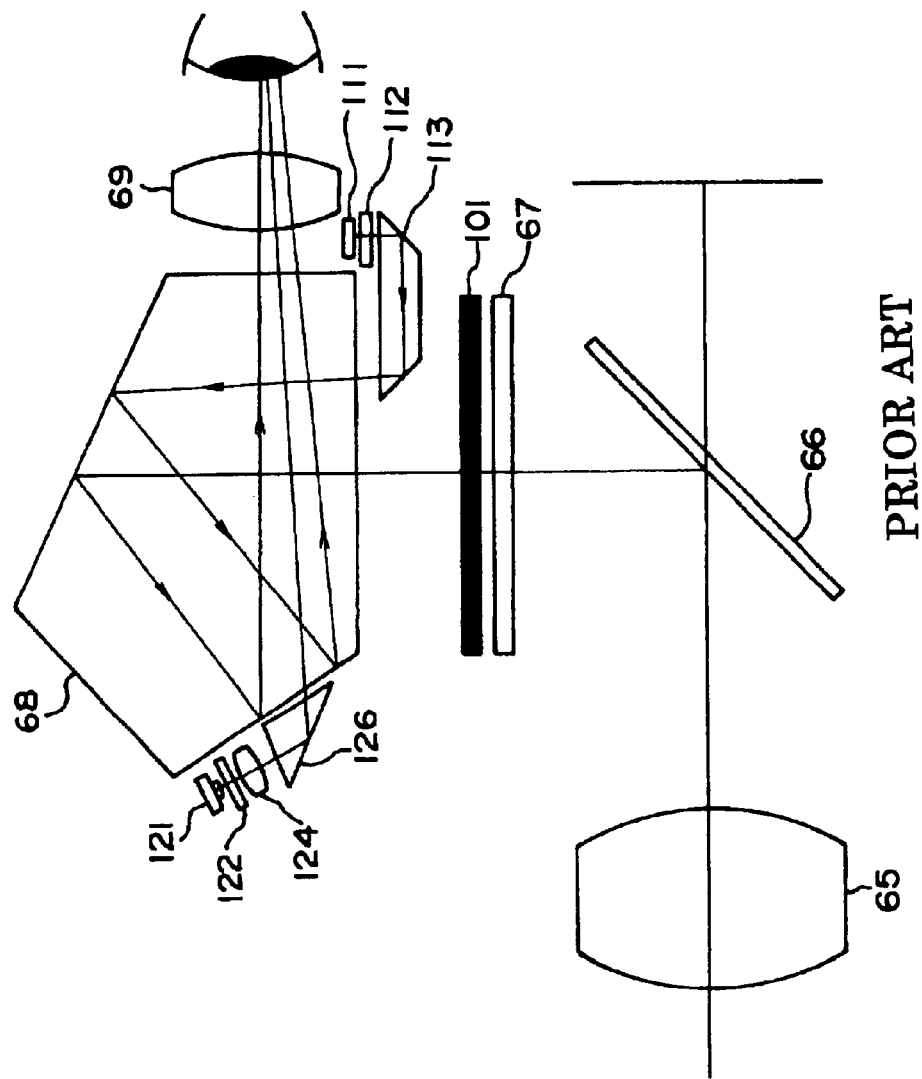
FIG. 14 shows the structure of a finder optical system in another conventional example.

The finder optical system is provided with a taking lens 65 disposed within an interchangeable lens IL, a reflective mirror 66 installed within the camera CA, a focusing plate 67, pentagonal roof prism 68, and eyepiece lens 69, and the display device 74 is arranged medially to the focusing plate 67 for forming an object image and the pentagonal roof prism 68, as shown in FIG. 11.

The display device 74 shown in FIG. 9 is visible within the finder. The display device 74 includes, on the interior side of the field-of-view frame 4, the display marks, i.e., the focus detection area frames 81k through 86k, panorama frames 87k and 88k, and a spot photometry frame 89. Since there are many frames for displaying and it is difficult to see all the frames, each of the frames 81k through 89k are formed of transparent electrodes and organic electroluminescent material so as to be unrecognized in the normal state. Then, specified frames are caused to luminesce either automatically or via selection by a user so as to render visible only the necessary frames when required.

Since the electrical resistance is higher when the electrodes are transparent than when they are non-transparent, the left and right frames are separated, as shown in the drawing, with the electrode wiring areas 81a through 89a arranged to make connection at minimum distance to the connectors 80 and 81c through 89c provided at the end of the long edge side of the display device 74.

Since a higher lighting drive voltage is required when both the positive electrode and the negative electrode are transparent compared to when only part of the negative electrode is transparent, the display area 1 of the non-transparent electrode part of the in-finder display area 6 and the display area 2 of the transparent electrode part within the field-of-view frame 4 may have separate power supply systems 92a and 92b, and, 96a and 96b.

As described above, the camera of each embodiment is provided with a finder display device of simple construction which allows a display within the finder to be easily viewed The present invention is not limited to the previously described embodiments, and may be realized various other modes. For example, the present invention is suitable for use in devices for viewing a object such as digital cameras, binoculars, distance measuring devices, monitoring cameras and the like.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A display device for placement in an optical path of an object viewer for viewing an object, comprising:
    a first electrode which is made of a transparent material;
    a second electrode which is made of a non-transparent material and which forms a display mark of a shape of the second electrode;

a luminescent material provided between said first and second electrodes, said luminescent material emitting light forming the shape of said second electrode when electricity is provided to said electrodes, the second electrode covering only a portion of the luminescent material provided between the first and second electrodes; and a connection line which is made of a transparent material and electrically connects said second electrode to an exterior portion of said display device, wherein the non-transparent material blocks light in the shape of the second electrode in the optical path when light comes from the object.

2. A display device according to claim 1, wherein said display device is shaped in the form of a rectangle, and said connection line connects said second electrode to a longer side of the rectangle.

3. An optical device, comprising:

an object viewer for observing an object and having an optical path within the object viewer;

an eye piece lens disposed at one end of the optical path;

a luminescent element disposed in the optical path of said object viewer such that light coming from the object is passed through said luminescent element so at to reach the eye piece lens, said luminescent element having electrodes and a luminescent material provided between the electrodes and emitting light when electricity is supplied to the electrodes;

wherein one of the electrodes of the luminescent element is made of a non-transparent material and forms a display mark; and wherein the luminescent material emits light forming the shape of said one of the electrodes when the luminescent element is supplied with electricity and the non-transparent material blocks light forming the shape of said one of the electrodes when light comes from the object.

4. An optical device according to claim 3, wherein said one of the electrode is disposed on the object side of the luminescent material.

5. An optical device according to claim 3, wherein the luminescent material is a thin film of an organic electroluminescent material.

6. An optical device according to claim 3, wherein the optical device is a camera for taking a photograph.

7. The optical device of claim 3, further comprising a luminance detector for detecting an object brightness and a controller for controlling supply of the electricity to said electrodes in response to the detection result.

8. A finder for a camera having an optical path within the finder for viewing a photographic object, said finder comprising an eye piece lens disposed at one end of the optical path and a luminescent element disposed in the optical path of the finder such that an image of the photographic object is viewed through the luminescent element and the eye piece lens, said luminescent element comprising electrodes and a luminescent material provided between the electrodes and emitting light when electricity is supplied to the electrodes;

wherein one of the electrodes of the luminescent element is made of a non-transparent material and forms a display mark; and wherein the luminescent material emits light forming the shape of said one of the electrodes when the luminescent element is supplied with electricity and the non-transparent material blocks light forming the shape of said one of the electrodes when light comes from the object.

9. A finder of a camera according to claim 8, wherein said one of the electrodes is disposed on the photographic object side of the luminescent material.

10. A finder of a camera according to claim 8, wherein said luminescent material is a thin film of an organic electroluminescent material.

11. An optical device, comprising:

an object viewer for observing an object and having an optical path therein;

a luminescent element comprising a first portion disposed in the optical path of the object viewer being configured such that light coming from the object passes through the luminescent element and a second portion disposed outside the optical path, each of the first and second portions comprising electrodes and a luminescent material provided between the electrodes and emitting light when electricity is provided to the electrodes; and first and second drive circuits for independently supplying electricity to the first and second portions, respectively.

12. An optical device according to claim 11, wherein the luminescent material is a thin film of an organic electroluminescent material.

13. An optical device according to claim 11, wherein the optical device is a camera for taking a photograph.

14. The optical device of claim 11, further comprising a selector for selecting one of the first portion and the second portion, and a power supply circuit for supplying electricity to the selected portion.

* * * * *